US006986589B2

(12) United States Patent
Evans et al.

(10) Patent No.: US 6,986,589 B2
(45) Date of Patent: Jan. 17, 2006

(54) APPARATUS AND METHODS FOR PROVIDING AN EMERGENCY LIGHTING AUGMENTATION SYSTEM

(75) Inventors: Donald F. Evans, Pinehurst, NC (US); Robert O. Brady, Sarasota, FL (US); Mark D. Schmidt, Durham, NC (US)

(73) Assignee: Cyberlux Corporation, Pinehurst, NC (US)

( * ) Notice: Subject to any disclaimer, the term of this patent is extended or adjusted under 35 U.S.C. 154(b) by 0 days.

(21) Appl. No.: 10/734,349

(22) Filed: Dec. 13, 2003

(65) Prior Publication Data
US 2005/0007024 A1 Jan. 13, 2005

Related U.S. Application Data

(60) Provisional application No. 60/510,915, filed on Oct. 14, 2003.

(51) Int. Cl.
F21V 19/04 (2006.01)
(52) U.S. Cl. .................. 362/20; 362/276; 362/800; 362/802; 315/86; 340/635
(58) Field of Classification Search .............. 362/20, 362/95, 545, 276, 800, 802; 315/86; 340/635
See application file for complete search history.

(56) References Cited

U.S. PATENT DOCUMENTS

| | | | |
|---|---|---|---|
| 2,863,038 A | 12/1958 | Lombardo | |
| 3,739,226 A | 6/1973 | Seiter et al. | |
| 3,860,829 A | 1/1975 | Fabbri | |
| 4,107,766 A | 8/1978 | Baker | |
| 4,177,500 A * | 12/1979 | Nicholl et al. | 362/20 |
| 4,454,452 A | 6/1984 | Feldstein | |
| 4,631,649 A | 12/1986 | McCue et al. | |
| 5,412,542 A * | 5/1995 | Mandy | 362/20 |
| 5,463,595 A | 10/1995 | Rodhall et al. | |
| 5,473,517 A | 12/1995 | Blackman | |
| 5,539,623 A | 7/1996 | Gurz et al. | |
| 5,655,830 A | 8/1997 | Ruskouski | |
| 5,734,229 A | 3/1998 | Bavaro et al. | |
| 5,813,873 A | 9/1998 | McBain et al. | |
| 5,833,350 A * | 11/1998 | Moreland | 362/95 |

(Continued)

FOREIGN PATENT DOCUMENTS

GB    2 355 605 A    4/2001

(Continued)

OTHER PUBLICATIONS

Copy of International Search Report for PCT Application No. PT/US2004/041702; Filed Dec. 13, 2004; Date of Completion Mar. 29, 2005; Date of Mailing Mar. 5, 2005.

Primary Examiner—John Anthony Ward
Assistant Examiner—James W Cranson, Jr.
(74) Attorney, Agent, or Firm—Alston & Bird LLP

(57) ABSTRACT

The present invention includes an emergency lighting device comprising, at least one light emitting diode (LED), a local energy source such as a lithium ion battery, a control circuit in electric communication with the at least one LED and further sensing a main power supply, and a reflector for broadcasting light produced by the LED to designated areas. In particular, the present invention transforms existing fluorescent, incandescent or halogen light fixtures into emergency lighting systems for homes, hospitals, hotels, nursing homes and businesses. The device includes a power sensor for triggering the control circuit to engage the LEDs when electrical service is disrupted, thereby broadcasting a wash of light over an otherwise darkened room or corridor.

22 Claims, 7 Drawing Sheets

U.S. PATENT DOCUMENTS

| | | |
|---|---|---|
| 6,000,807 A | 12/1999 | Moreland |
| 6,010,228 A | 1/2000 | Blackman et al. |
| 6,045,232 A | 4/2000 | Buckmaster |
| 6,107,744 A | 8/2000 | Bavaro et al. |
| 6,502,044 B1 | 12/2002 | Lane et al. |
| 6,505,950 B1 | 1/2003 | Natoli et al. |
| 6,520,669 B1 * | 2/2003 | Chen et al. .................. 362/545 |
| 6,646,545 B2 | 11/2003 | Bligh |
| 6,741,324 B1 | 5/2004 | Kim |
| 6,863,417 B2 * | 3/2005 | Hill ............................ 362/233 |
| 2001/0040798 A1 | 11/2001 | Appelberg et al. |
| 2002/0149929 A1 | 10/2002 | Evans et al. |
| 2003/0133311 A1 | 7/2003 | Robertson et al. |
| 2003/0137258 A1 | 7/2003 | Piepgras et al. |
| 2004/0062055 A1 | 4/2004 | Rozenberg et al. |
| 2004/0120152 A1 * | 6/2004 | Bolta et al. .................. 362/294 |
| 2004/0257789 A1 * | 12/2004 | Nielson et al. ............... 362/20 |

FOREIGN PATENT DOCUMENTS

| | | |
|---|---|---|
| JP | 09063326 | 3/1997 |
| WO | WO 01/714244 A1 | 9/2001 |
| WO | WO 02/16826 A1 | 2/2002 |

* cited by examiner

APPARATUS AND METHODS FOR PROVIDING AN EMERGENCY LIGHTING AUGMENTATION SYSTEM

CROSS-REFERENCES TO RELATED APPLICATIONS

This application claims the benefit of U.S. provisional patent application Ser. No. 60/510,915, filed Oct. 14, 2003, which is fully incorporated herein by reference.

BACKGROUND OF THE INVENTION

1) Field of the Invention

The present invention relates generally to the field of illumination and, more particularly, the invention relates to a solid state lighting source such as a light-emitting diode (LED) device that provides prolonged emergency lighting in response to a power loss event.

2) Description of Related Art

Periodically, homes, offices, public buildings, hospitals, industrial manufacturing facilities and the like, experience emergency situations which cause power failures leaving these buildings entirely without light. Such power failures may result from electrical short circuits, brownouts, fire, accidents, natural disasters (i.e., floods, hurricanes, tornados, etc.) or a planned shutdown of electricity within a facility or dwelling. Should these facilities remain without power, especially in the critical areas of these facilities (e.g., intensive care units of hospitals, exit hallways and stairwells generally, and the like) the public safety is placed at risk. Accordingly, local, state and federal authorities have required that emergency lighting systems be installed in all critical areas of public buildings.

Conventional stand-alone emergency lighting systems consist of incandescent, fluorescent or halogen lamps powered by NiCad, NiMh, Alkaline, or sealed lead battery modules. Such units are generally able to provide between 1 and 3 hours of effective emergency lighting. Unfortunately, however, most emergency-generated power outages last much longer than three hours. Further, the need for effective lighting may not be realized until the disaster has abated. For example, after a fire or earthquake rescue crews may need to search buildings or other dwellings for injured occupants. In such cases, rescue crews are currently left to perform their search and rescue without the aid of emergency light.

Accordingly, a need exists to provide a device for automatic, high-level illumination that is capable of immediate activation in response to a disruption of power. In such emergency situations, it is desirable for the illuminating device to be efficiently powered by a single battery pack or the like, such that the device is capable of constant high-level illumination lasting for several days or even weeks. Further, the illuminating device should be easily configured to adapt to existing fluorescent, incandescent or halogen light fixtures.

BRIEF SUMMARY OF THE INVENTION

The above and other needs are met by the present invention which includes an emergency lighting device comprising, at least one light emitting diode (LED), a local energy source such as a lithium ion battery, a control circuit in electric communication with the at least one LED and further sensing a main power supply, and a reflector for broadcasting light produced by the LED to designated areas. In particular, the present invention transforms existing fluorescent, incandescent or halogen light fixtures into emergency lighting systems for homes, hospitals, hotels, nursing homes and businesses. The device includes a power sensor for triggering the control circuit to engage the LEDs when electrical service is disrupted, thereby broadcasting a wash of light over an otherwise darkened room or corridor.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout.

Figure 1:
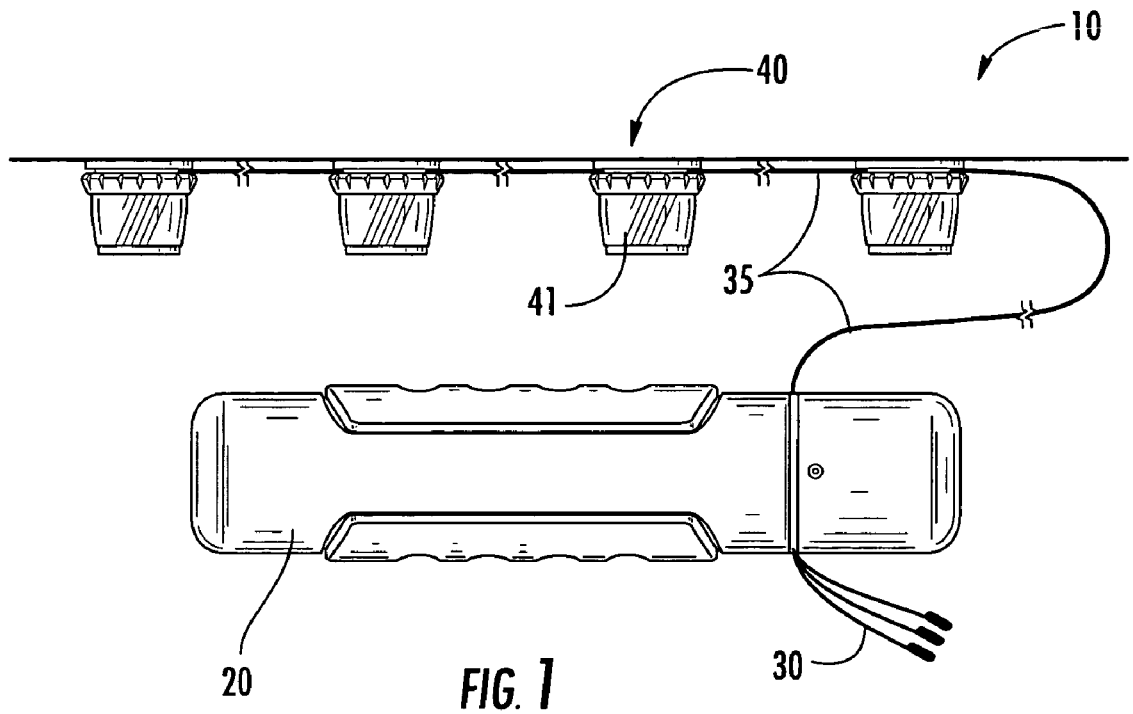
FIG. 1 depicts a perspective view of an emergency lighting device in accordance with one embodiment of the present invention.

FIG. 1 depicts a perspective view of a lighting device in accordance with one embodiment of the present invention.

According to the depicted embodiment, the emergency lighting device 10 structurally comprises, a main body housing 20, a power supply connector 30, an array of light emitting diodes 40 (LEDs) and a LED wire 35. In particular, electricity is channeled from the main body housing 20 to the LEDs 40 via a LED wire 35. Although depicted as including a plurality of individual LED units 41, the present invention may include as few as one LED unit 41.

Figure 2:
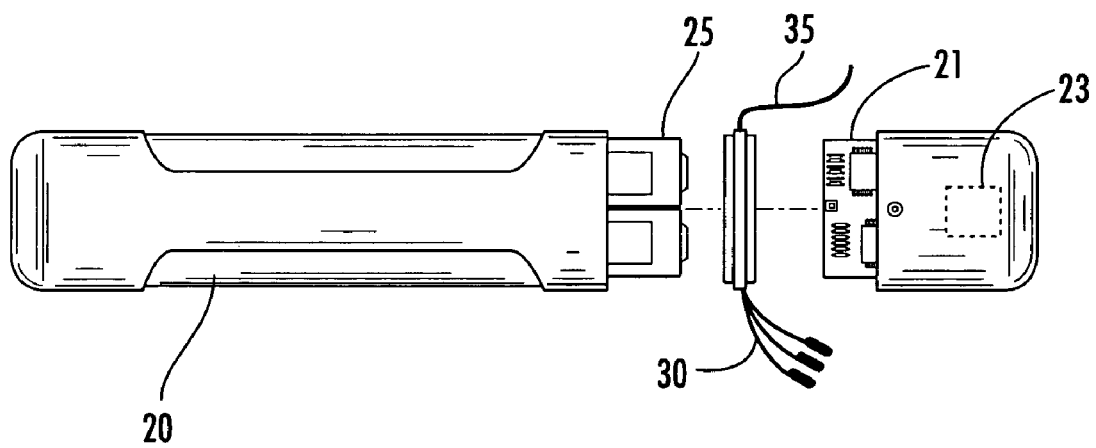
FIG. 2 illustrates a partially exploded perspective view of an emergency lighting device, in accordance with an embodiment of the present invention.

Within the enclosure provided by the main body housing 20, as illustrated in FIG. 2, the lighting device 10 further comprises a circuit board 21 having a control circuit (not shown), a power sensor 22 and a local energy source 25. The local energy source 25 may include a battery pack or other similar self-contained power unit as known to one of ordinary skill in the art. In addition, a battery charger (not shown) may also be provided in those embodiments employing re-chargeable batteries. These components are provided in electrical communication via corresponding electrical circuitry.

According to the depicted embodiment, the emergency lighting device 10 is electrically connected to a main power supply (not shown) of a building via the main power supply connector 30. Once installed, the device provides emergency light to designated areas of the building for extended periods of time upon disruption of the building's main power supply. Specifically, in emergency situations, or when the main power supply is otherwise disrupted, the power sensor 22 triggers the control circuit 23 to engage the LEDs 40. Advantageously, the LEDs 40 efficiently draw energy from the local energy source 25 and depending upon the source used, may provide effective emergency lighting for more than 40 hours. During periods when the main power supply is functioning properly, according to one embodiment, a battery charger (not shown) may be provided to draw energy from the main power supply and thereby re-charge the battery pack or other similar local energy source 25.

Although the control circuit 23, local energy source 25, and LEDs 40 are shown in FIGS. 1 and 2 as one integral unit, these components may optionally be mounted remote from one another. For example, according to one embodiment, a single control circuit 23 provides a signal which engages a single remote LED 40 which is powered by a dedicated local energy source 25. Alternatively, in another embodiment, a single control circuit 23 provides a signal which engages multiple remote LEDs 40 which may be powered by a single local energy source 25 or multiple dedicated local energy sources 25. The signal provided by the control circuit 23 in the above circumstances may be provided by standard "hardwired" means, such as by wire or connector, or alternatively by RF or other wireless technologies as known to one of ordinary skill in the art.

Figure 3:
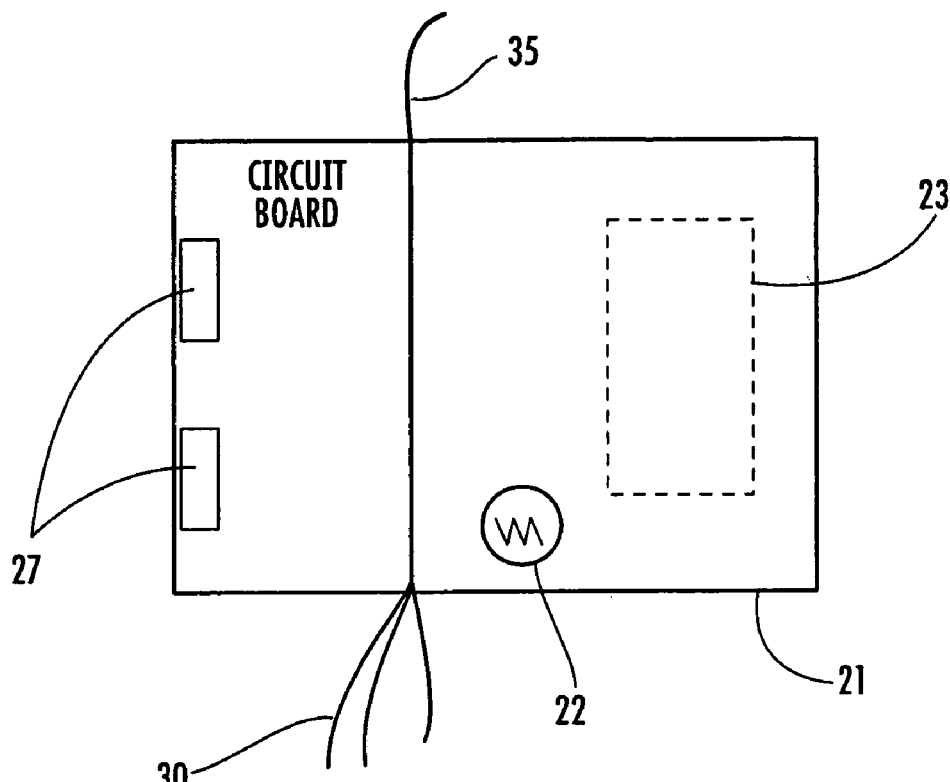
FIG. 3 illustrates a schematic view of an electronic circuit board, in accordance with one aspect of the present invention.

FIG. 3 provides a schematic illustration of a circuit board 21 in accordance with one embodiment of the present invention. According to this embodiment, the circuit board 21 supports and provides electronic communication between the power sensor 22, electrodes 27 for contacting a local energy source 25, and the control circuit 23. In addition, a LED wire 35 and main power supply connector 30 are attached for providing electronic communication with the LEDs 40 and main power supply, respectively. In this regard, the main power supply connector 30 may be integral with the LED wire 35 as shown, or alternatively, may be attached to the circuit board 21 via distinct connectors (not shown). As referenced above, the power sensor 22 senses the status of the main power supply and provides input to the control circuit 23, which selectively engages the LEDs 40 to operate in either a rest mode or a luminance mode.

Figure 4:
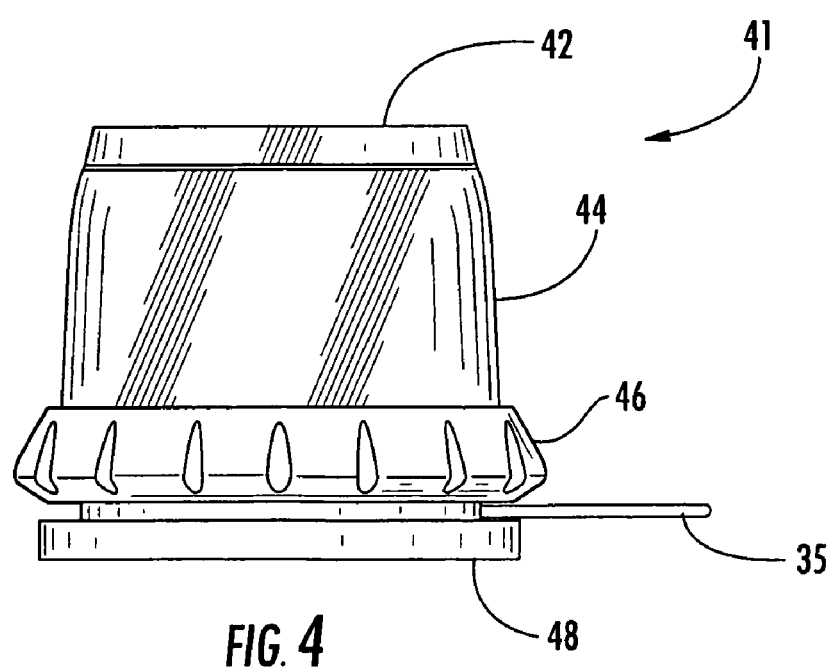
FIG. 4 illustrates a detail view of a LED unit, in accordance with another embodiment of the present invention.
Figure 5:
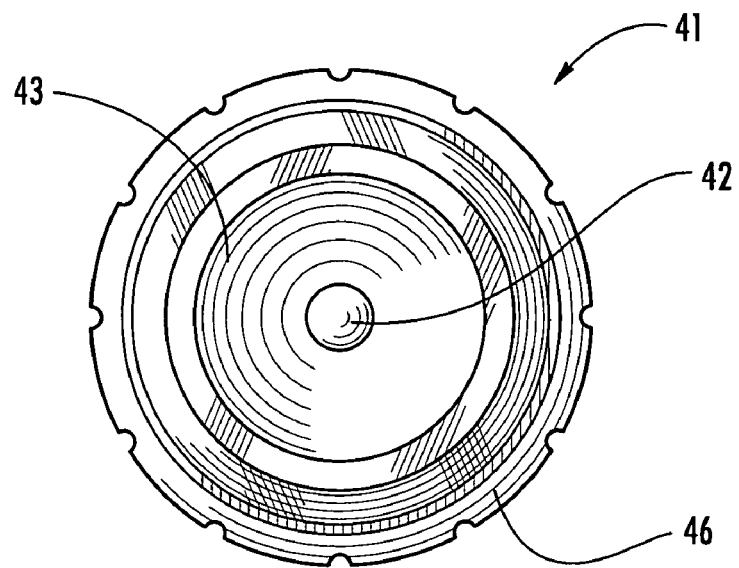
FIG. 5 illustrates a top view of a LED unit, in accordance with one embodiment of the present invention.

FIG. 4 illustrates a detail view of an individual LED unit 41 in accordance with one embodiment of the present invention. In particular, according to the depicted embodiment, the LED unit 41 comprises a LED 42, a LED housing 44, a LED base 46 and a mounting surface 48. As illustrated in FIG. 5, the LED housing 44 encloses the LED 42 and also supports a reflector (not shown) for directing the light emitted by the LED 42. To accommodate proper installation, the mounting surface 48 of the LED unit 41 may be adapted to incorporate an adhesive agent, slots or grooves, mounting screws or other similar means as known to one of ordinary skill in the art. Further, electrical energy is provided to the LED unit 41 via a LED wire 35.

FIG. 5 depicts a top view of an LED unit 41, in accordance with one embodiment of the present invention. As referenced above, an LED unit 41 is depicted having an LED 42 positioned within a reflector 43 for reflecting light in desired directions. In one embodiment the reflector 43 may be a parabolic reflector. As a result, the geometric relationship between the LED 42 and the reflector 43 aids in dispersing the light, resulting in a lighting device 10 that is capable of broadcasting a wide-area blanket of light up appending walls or off of ceilings so as to properly illuminate a darkened room or corridor. In the embodiment shown in FIG. 5, the LED 42 is directed outwardly, away from the concave surface of the reflector 43. In another embodiment, the LED 42 may be directed inwardly (not shown), toward the concave surface of the reflector 43. The concave surface of the reflector 43 are typically highly polished to provided the necessary degree of reflectivity. Alternatively, the concave surface of the reflector 43 may be coated with a reflective material.

As discussed above, in one embodiment, a power sensor 22 provides an on/off signal to the control circuit 23, based upon a sensed main power supply disruption. If a main power supply disruption is present, an "off" signal is sent by the power sensor 22 to the control circuit 23, which thereby engages the LEDs 40 to operate in a luminance mode. Accordingly, the LEDs 40 provide lighting to the darkened room or corridor. Advantageously, the LEDs 40 of the present invention consume over 90 percent less energy than standard incandescent light bulbs, thereby increasing prospective emergency lighting term from a few hours to several weeks. If no main power disruption is sensed, an "on" signal is sent by the power sensor 22 to the control circuit 23, and the LEDs 40 remain unengaged pending further input as discussed below.

To operate effectively, the lighting device according to several embodiments of the present invention requires only 1.) electrical communication with a power supply which subject to interruption, and 2.) proper location within a building or other structure so as to be useful to occupants thereof during emergency or other power disruptions. With regard to location, the lighting device according to the present invention may be physically mounted in any location within a building, however, one area of convenient mounting is adjacent the building's existing light fixtures. Such areas provide ready access to the building's main power supply and generally already exist in areas where light is desired by building occupants. Further, as described in detail below, relatively little retro-fit is required within such fixtures to support the lighting devices of the present invention in an aesthetically pleasing manner.

Figure 6:
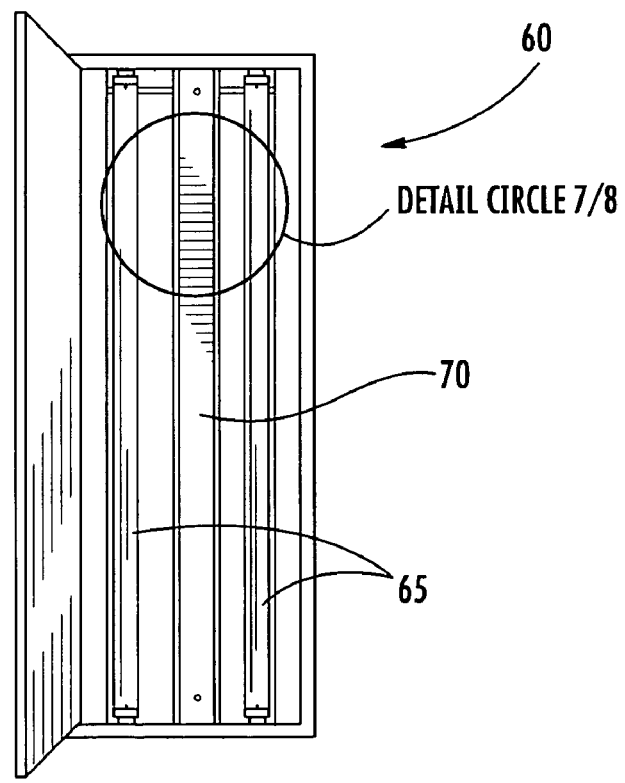
FIG. 6 illustrates a perspective view of a conventional light fixture which is provided for illustration purposes. In particular, the depicted fixture is one of many lighting fixtures which are usable in conjunction with an emergency lighting device according to one embodiment of the present invention.
Figure 7:
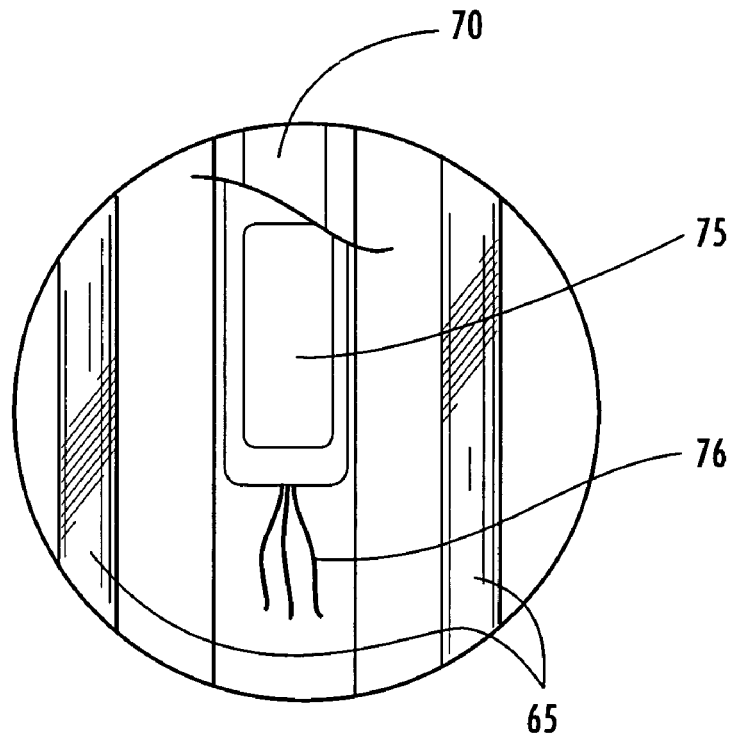
FIG. 7 illustrates a detail view of a partially sectioned light fixture assembly as used in conjunction with one embodiment of the present invention, taken along circle 7/8 of FIG. 6.

FIGS. 6 and 7 illustrate perspective views of a conventional fluorescent light fixture. Such fixtures are commonly used in public buildings and are readily adapted for use in conjunction with several embodiments of the emergency lighting device 10 according to the present invention. Typically, fluorescent light fixtures 60 include at least one fluorescent light tube or bulb 65 and corresponding electrical circuitry (not shown) for providing electric current thereto. As illustrated in FIG. 7, a ballast 75 may also be provided to control the electric current applied to the fluorescent tubes 65. Further, a ballast cover 70 is generally provided to aesthetically hide the ballast 75 from view. Although a fluorescent light fixture is provided for illustration purposes, the inventive concepts described herein are not limited to use in such a fixture. In fact, the present invention is useful in conjunction with any light fixture or application (e.g., incandescent, halogen, neon, etc.,) which is in communication with a power supply that is subject to interruption. Further, as described above, the present invention may provide emergency lighting completely removed from any existing light structure.

Figure 8:
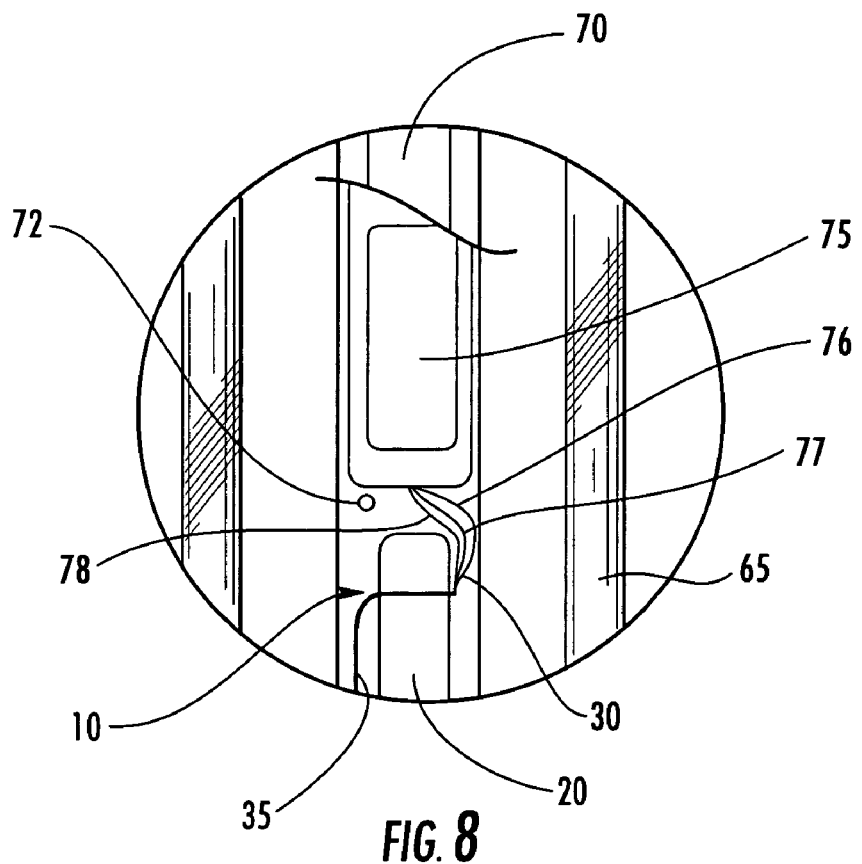
FIG. 8 illustrates a detail view of a partially installed emergency lighting device in accordance with one embodiment of the present invention, taken along circle 7/8 of FIG. 6.

FIG. 8 depicts a schematic view of a lighting device in accordance with yet another embodiment of the present invention. According to the depicted embodiment, the emergency lighting device 10 attaches to a conventional ballast 75 as shown. In particular, the device 10 attaches to the power wire 76, ground 77 and neutral wires 78 of a conventional ballast 75. Alternatively, as referenced above, in other embodiments the device may tap directly into the main power supply without using the ballast 75. According the embodiment described by FIG. 8, the main body housing 20 (and the enclosed local energy source 25, circuit board 21, etc.) may be mounted within the recess 72 provided to house the ballast 75 as shown. Thus, the ballast cover 70 may be re-installed to aesthetically hide both the ballast 75 and the housing 20 from view without further retrofit.

Figure 9:
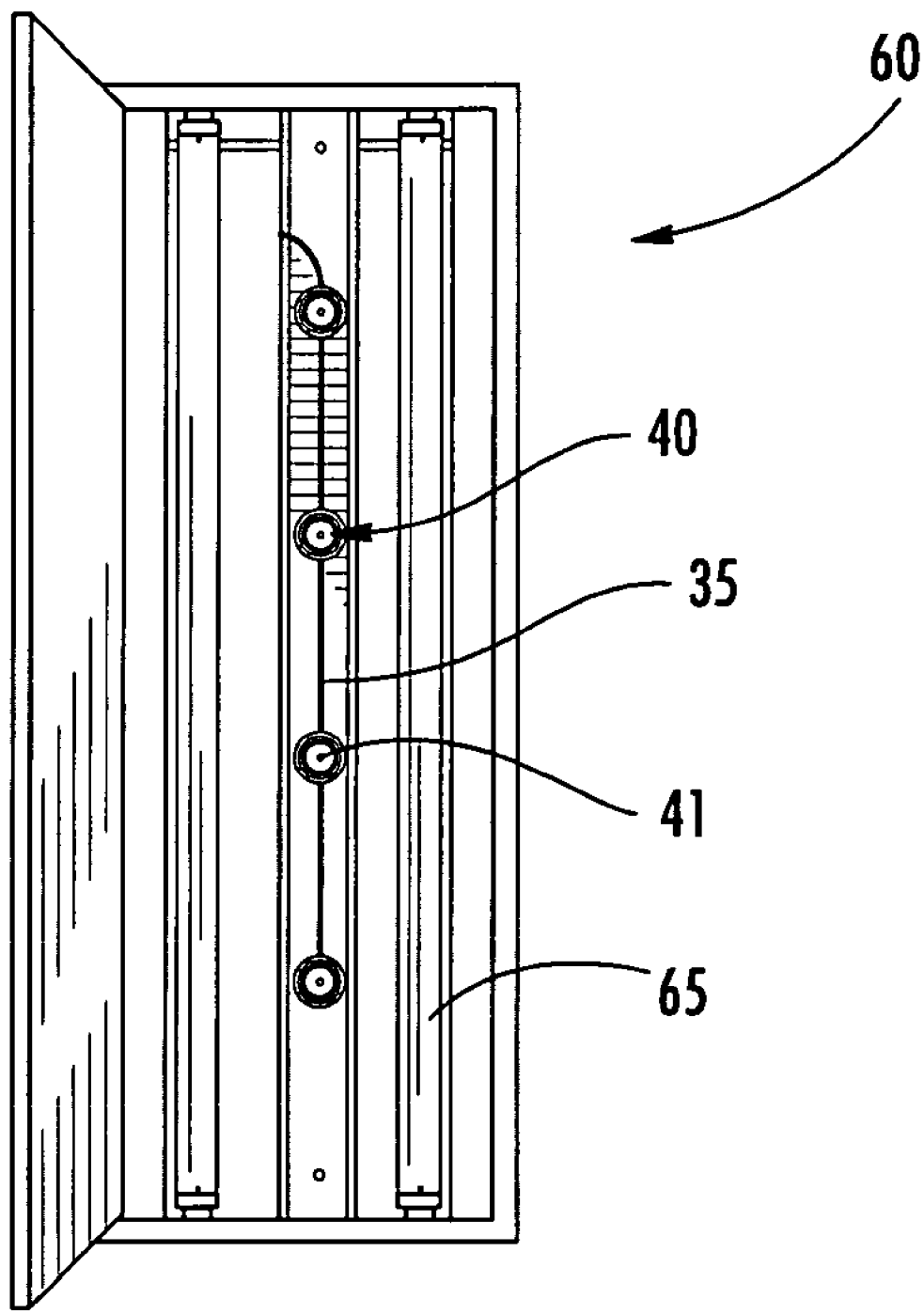
FIG. 9 illustrates a perspective view of an fully installed emergency lighting device in accordance with one embodiment of the present invention.

As illustrated in FIG. 9, according to one embodiment of the present invention the LEDs 40 may be installed directly to the ballast cover 70. In particular, the LED array 40 may be adhered to the surface of the cover, provided within cut-outs or recessed openings, or otherwise attached as known to one of ordinary skill in the art. Alternatively, in another embodiment the LEDs 40 may be secured to an exterior wall surrounding the fixture (not shown). In addition, in yet another embodiment, the LEDs 40 may be secured or located remotely from the unit as known to one of ordinary skill in the art. In addition, although shown in a linear configuration, the LEDs 40 according to present invention may be provided in a circular, elliptical, rectangular or other similar pattern without departing from the inventive concepts herein disclosed.

Figure 10:
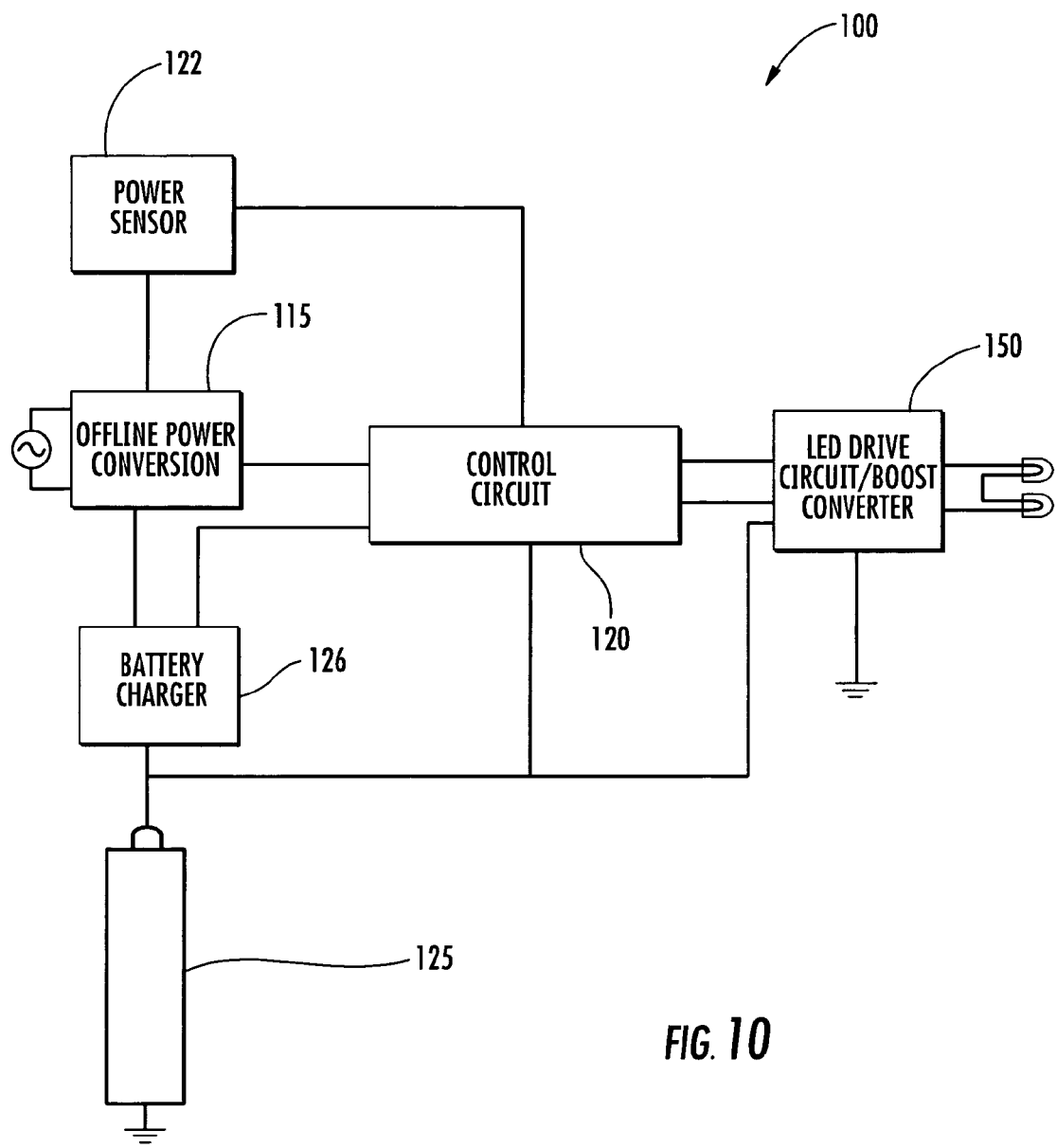
FIG. 10 illustrates an electrical schematic drawing in accordance with one embodiment of the present invention.

FIG. 10 provides an electrical circuit diagram with regard to yet another embodiment of the present invention. According to this embodiment, the lighting device includes an electrical circuit 110, comprising a control circuit 120 that is attached to a PC board (not shown) and structured in electrical communication with a power sensor 122, an off-line power conversion 115, and a LED drive circuit/boost converter 150. The control circuit 120 registers signals provided by the power sensor 122 and further, provides the necessary logic to engage the LED drive circuit/boost converter 150, which thereby engages the array of LEDs 30 to operate in either a rest mode or a high level luminance mode. In another embodiment, a local energy source 125 is provided in electrical communication with a battery charger 122; the charger 122 being connected to a main power supply for powering the charger 122 and subsequently charging the local energy source 125 as needed.

Figure 11:
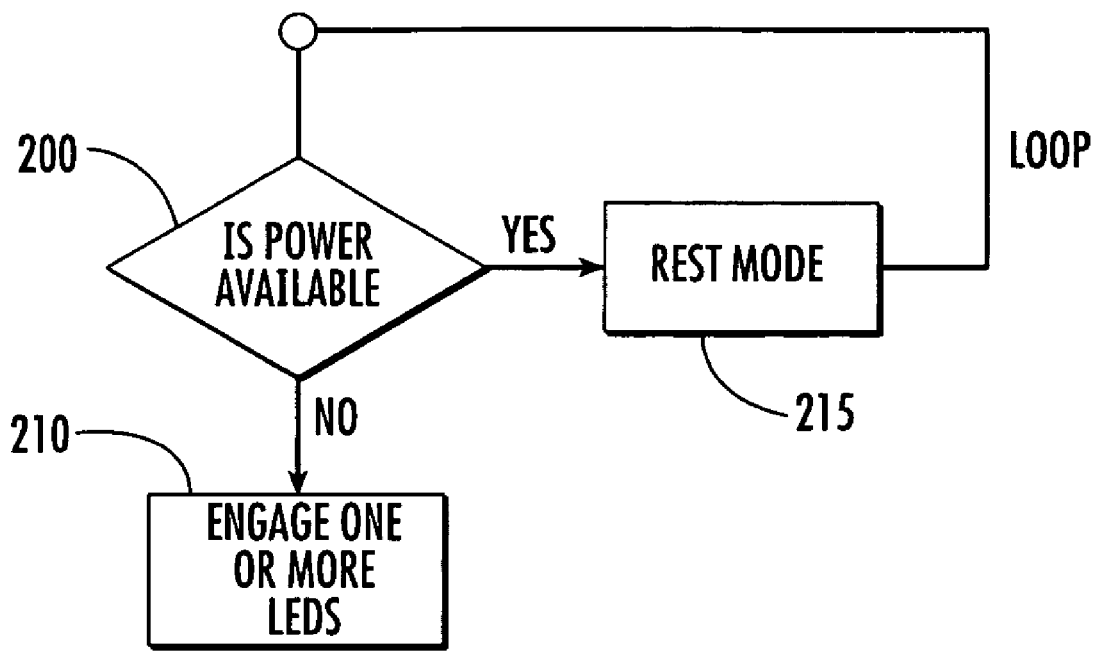
FIG. 11 depicts a flow diagram of a method for implementing an emergency lighting system, responsive to disruption of a main power supply in accordance with one embodiment of the present invention.

FIG. 11 illustrates a method for implementing an emergency lighting system having power disruption responsiveness, in accordance with one embodiment of the present invention. According to this embodiment, the method comprises the step of sensing a main power supply 200. If the main power supply has been interrupted, a luminance LED step 210 is triggered. If the main power supply is uninterrupted, the LEDs 30 are engaged to operate in a rest mode 215. Finally, in several embodiments of the present invention, the emergency lighting system is designed to loop so as to repeat the above-described method indefinitely upon activation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A lighting device having a power sensor for sensing a disruption in a main power supply, the lighting device comprising:
    at least one light emitting diode (LED) in electrical communication with corresponding electrical circuitry;
    a local electrical energy source for supplying electrical energy to said at least one LED;
    an LED drive circuit/boost converter;
    a control circuit in electrical communication with said at least one LED, said LED drive circuit/boost converter, and the power sensor, wherein upon sensing the disruption in the main power supply the power sensor signals said control circuit to engage said LED drive circuit/boost converter and, thus, operatively engage said at least one LED to illuminate; and
    a reflector positioned proximate to said at least one LED for reflecting light provided by said LEDs.

2. A lighting device as recited in claim 1, wherein said at least one LED is mounted adjacent a light fixture.

3. A lighting device as recited in claim 1, wherein said at least one LED is a white LED.

4. A lighting device as recited in claim 1, wherein said at least one LED is an amber LED.

5. A lighting device as recited in claim 1, wherein said local energy source is an electrochemical battery pack.

6. A lighting device as recited in claim 5, further comprising a battery charger in electronic communication with said the power supply for charging said battery pack.

7. A lighting device as recited in claim 6, wherein said control circuit operatively engages said at least one LED via wireless technology.

8. A lighting device as recited in claim 7, wherein said local energy source, the power sensor and said control circuit are in electrical communication via a circuit board; and wherein a housing encloses said local energy source, the power sensor, said control circuit and said circuit board.

9. A lighting device as recited in claim 8, wherein said housing is mounted adjacent a light fixture.

10. A lighting augmentation device having a power sensor for sensing a disruption in a main power supply, the lighting augmentation device comprising:
    a light fixture comprising, at least one light bulb having at least one electrode, wherein said at least one electrode of said at least one light bulb is in electrical communication with the main power supply;

at least one light emitting diode (LED) in electrical communication with corresponding electrical circuitry;

a local electrical energy source for supplying electrical energy to said at least one LED;

an LED drive circuit/boost converter;

a control circuit in electrical communication with said at least one LED, said LED drive circuit/boost converter, and the power sensor, wherein upon sensing the disruption in the main power supply the power sensor signals said control circuit to engage said LED drive circuit/boost converter and, thus, operatively engage said at least one LED to illuminate; and a reflector positioned proximate to said at least one LED for reflecting light provided by said at least one LED.

11. A lighting augmentation device as recited in claim 10, further comprising a ballast in electrical communication with the at least one electrode of said at least one light bulb and the main power supply; said ballast for regulating the current applied to said at least one light bulb; and wherein the power sensor is in electrical communication with said main power supply via said ballast.

12. A method of providing emergency lighting using a power sensor configured to sense a disruption to a main power supply, the method comprising:

providing at least one light emitting diode (LED) in electrical communication with corresponding electrical circuitry;

providing a local electrical energy source for supplying electrical energy to said at least one LED;

providing an LED drive circuit/boost converter;

providing a control circuit in electrical communication with said at least one LED, said LED drive circuit/boost converter and the power sensor;

signaling said control circuit to engage said LED drive circuit/boost converter and, thus, operatively engage said at least one LED to illuminate in response to the power sensor sensing a disruption of the main power supply; and providing a reflector positioned proximate to said at least one LED for reflecting light provided by said LEDs.

13. A lighting device having a power sensor for sensing a disruption in a main power supply, the lighting device comprising:

a plurality of light emitting diodes (LEDs) configured in a substantially circular pattern, wherein said plurality of LEDs are disposed in electrical communication with corresponding electrical circuitry, wherein at least three of said plurality of LEDs include parabolic reflectors having a vertex, and wherein said at least three of said plurality of LEDs are disposed adjacent the vertexes of said parabolic reflectors;

a local electrical energy source for supplying electrical energy to said plurality of LEDs; and a control circuit in electrical communication with said plurality of LEDs and the power sensor, wherein said control circuit signals said plurality of LEDs to illuminate upon the power sensor sensing a disruption in the main power supply.

14. A lighting device as recited in claim 13, wherein said plurality of LEDs are mounted adjacent a light fixture.

15. A lighting device as recited in claim 13, wherein at least one of said plurality of LEDs are white LEDs.

16. A lighting device as recited in claim 13, wherein at least one of said plurality of LEDs are amber LEDs.

17. A lighting device as recited in claim 13, wherein said local energy source is an electrochemical battery pack.

18. A lighting device as recited in claim 17, further comprising a battery charger in electronic communication with said main power supply for charging said battery pack.

19. A lighting device as recited in claim 13, wherein said control circuit operatively engages said plurality of LEDs via wireless technology.

20. A lighting device as recited in claim 13, wherein said local energy source, the power sensor and said control circuit are in electrical communication via a circuit board; and wherein a housing encloses said local energy source, said control circuit and said circuit board.

21. A lighting device as recited in claim 20, wherein said housing is mounted remotely from said plurality of LEDs.

22. A method of providing emergency lighting incorporating a power sensor for sensing a disruption in a main power supply, the method comprising the steps of:

arranging a plurality of light emitting diodes (LEDs) in a substantially circular pattern;

providing a parabolic reflector adjacent each of said plurality of LEDs;

electrically connecting a local electrical energy source to said plurality of LEDs;

electrically connecting a control circuit to said plurality of LEDs and to the power sensor; and configuring said control circuit to operatively engage at least one of said plurality of LEDs to illuminate in response to the power sensor sensing a disruption of the main power supply.

* * * * *